United States Patent [19]

Nishizawa et al.

[11] Patent Number: 4,803,895
[45] Date of Patent: Feb. 14, 1989

[54] BALANCING MECHANISM

[75] Inventors: Shunichi Nishizawa; Toshio Tsubota; Takashi Chikura, all of Nagoya, Japan

[73] Assignee: Mitsubishi Jukogyo Kabushiki Kaisha, Tokyo, Japan

[21] Appl. No.: 52,160

[22] Filed: May 20, 1987

Related U.S. Application Data

[63] Continuation of Ser. No. 833,714, Feb. 27, 1986, abandoned.

[30] Foreign Application Priority Data

Mar. 1, 1985 [JP] Japan .................... 60-28037[U]

[51] Int. Cl.$^4$ ........................... B66C 1/00; G05G 1/00
[52] U.S. Cl. ...................................... 74/603; 414/735; 74/592
[58] Field of Search ............. 74/470, 519, 512, 592; 337/140, 141, 139; 60/527; 414/735; 901/23

[56] References Cited

U.S. PATENT DOCUMENTS

| | | | |
|---|---|---|---|
| 2,274,601 | 2/1942 | Hartgering et al. | 74/592 |
| 2,584,921 | 2/1952 | Rawnsley et al. | 74/592 |
| 2,789,875 | 4/1957 | Van Ordt | 74/592 |
| 2,821,091 | 1/1958 | Benner | 74/592 |
| 3,204,287 | 9/1965 | Gronbach | 74/592 |
| 3,302,763 | 2/1967 | Wobrock | 74/592 |
| 4,030,617 | 6/1977 | Richter | 901/23 |
| 4,431,366 | 2/1984 | Inaba et al. | 414/735 |

FOREIGN PATENT DOCUMENTS 1184230 12/1964 Fed. Rep. of Germany ........ 74/592

Primary Examiner—Gary L. Smith
Assistant Examiner—Vinh Luong
Attorney, Agent, or Firm—Wenderoth, Lind and Ponack

[57] ABSTRACT

A balancing mechanism having a vertical robot arm and horizontal robot arm pivotally mounted to the vertical arm and for each robot arm a link mechanism having a lever as well as a spring connected to the robot arm to be balanced through the link mechanism so that the spring expands and contracts in accordance with changes in the quantity of movement which occurs as the robot arm rotates or travels so as to balance the robot arm.

9 Claims, 3 Drawing Sheets

BALANCING MECHANISM

This application is a continuation of now abandoned application Ser. No. 833,714, filed Feb. 27, 1986 now abandoned.

BACKGROUND OF THE INVENTION

1. Field of the Invention

The present invention relates to a balancing mechanism, and more particularly it concerns a balancing mechanism which is suitable for use in balancing the arm of a robot employed in industry.

2. Description of the Prior Art

In an industrial robot, a plurality of arms are designed to balance by the inclusion of a balancing mechanism. In particular, in a robot which is operated in a playback mode so as to perform processes such as painting, welding or assembling, it is necessary for a human being to lead the robot through a desired path when teaching it, and the teaching capability can be increased if the arms of the robot are balanced at all positions along their paths.

Several types of balancing mechanisms are currently available, and one of the most simply constructed employs springs.

FIG. 4 shows a robot which incorporates a spring-type balancing mechanism, viewed from the front. Reference numeral 1 denotes a base of the robot on which a swivel slide 2 is rotatably mounted. A vertical arm 4 is pivotally mounted on a bracket 3 which is mounted on the swivel slide 2. A horizontal arm 5 is pivotally mounted on the upper part of the vertical arm 4, and has at its far end a wrist 6 having a plurality of degrees of freedom. Reference numeral 7 designates an actuator for driving the horizontal arm 5, which is disposed between the horizontal arm 5 and the bracket 3 provided on the swivel slide 2. Actuators of the swivel slide 2 and the vertical arm 4 are not shown in the Figure. A spring 8 is provided with the horizontal arm 5 so as to balance it and a spring 9 is provided with the vertical arm 4 so as to balance it and together the springs constitute a spring-type balancing mechanism.

In the above spring-type balancing mechanism, the balance of the arm changes as the inclination of the arm changes. In addition, the tension of the springs 8, 9 vary as they expand or contract. Therefore, it is practically impossible to balance the arm at all positions in its range of motion, and it loses its balance to a great degree near the end of its motion. The positioning of a heavy spring at the upper part of the arm increases its moment of inertia, which is also undesirable.

SUMMARY OF THE INVENTION

In view of the above-described status of the prior art, an object of the present invention is to provide a balancing mechanism which enables the balancing of the object to be balanced, such as a robot arm, wherever the object is located in its range of motion.

Referring to FIG. 3, which shows the general principle of a balancing mechanism, when an arm I which has an object of weight w mounted at one of its ends is supported at a support point P, the arm I is balanced at whatever angle it is inclined, if a weight, whose weight W is given by the following equation, is provided at the other end of the arm I:

$$W = w \times \frac{L_1}{L_2}$$

(where $L_1$ is the distance from the support point P to the object, and $L_2$ is the distance between the support point and the weight.)

In the case of a robot arm, it is not always possible to make w and W identical, owing to the space available. In addition, the provision of a weight increases the moment of inertia, thereby necessitating the use of springs.

The present invention is applied to a balancing mechanism of the type employing springs as a balancing means, and is designed to solve the above-described problems caused by the use of springs.

The balancing mechanism constructed in accordance with the present invention is based on the above-described knowledge, and includes therein a link mechanism having a lever, as well as a spring connected to an object to be balanced by the link mechanism, so that the spring can expand or contract in accordance with changes in the quantity of movement which are caused by the rotation or travel of the object, so as to balance the object to be balanced.

BRIEF DESCRIPTION OF THE DRAWINGS

FIG. 1(a) is a view as seen when looking in the direction of the arrow B in FIG. 1(c), FIG. 1(b) is a view as seen when looking in the direction of the arrow C in FIG. 1(c), and FIG. 1(c) is a section taken along the line A—A of FIG. 2;

DESCRIPTION OF THE PREFERRED EMBODIMENT

Figure 1A:
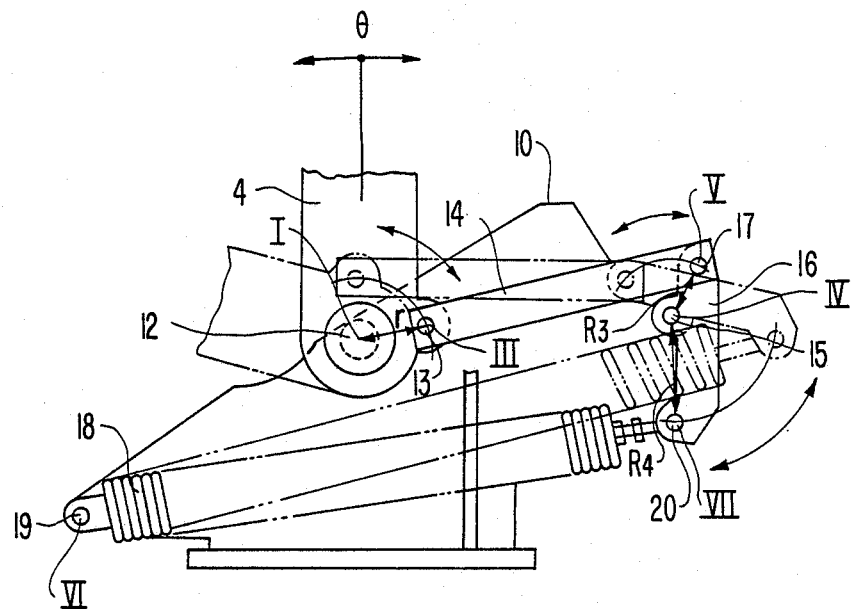
FIGS. 1(a), 1(b) and 1(c) are views showing an embodiment of the balancing mechanism according to the present invention, where
Figure 1B:
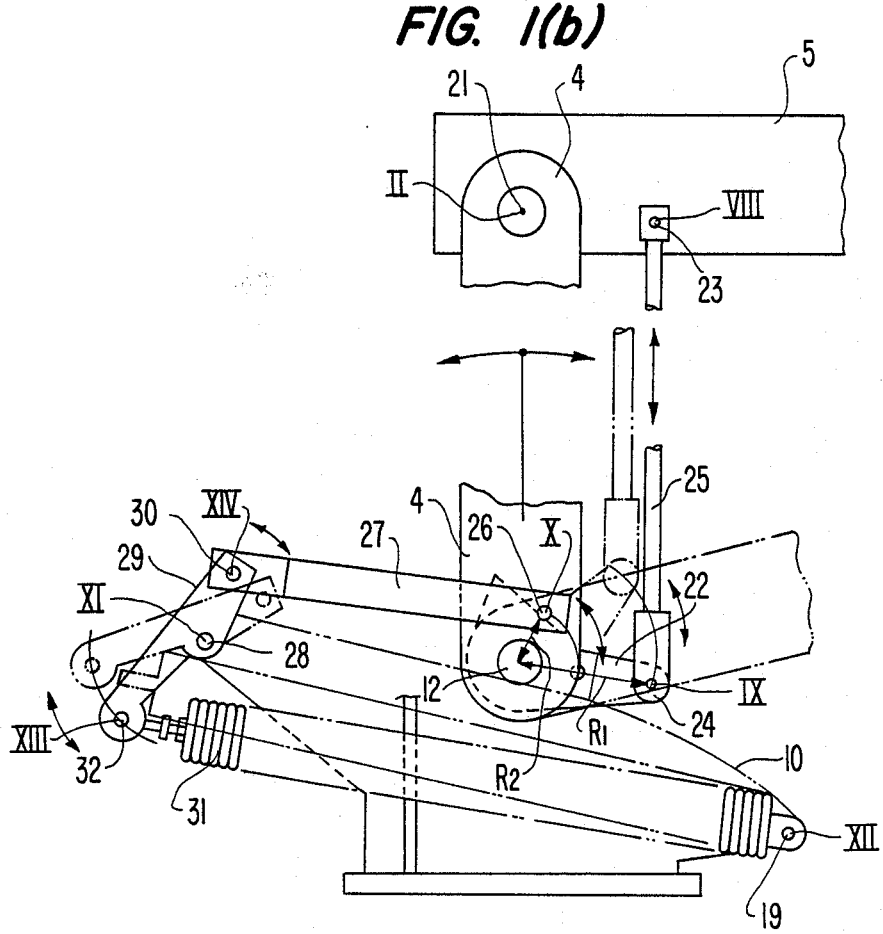
Figure 1C:
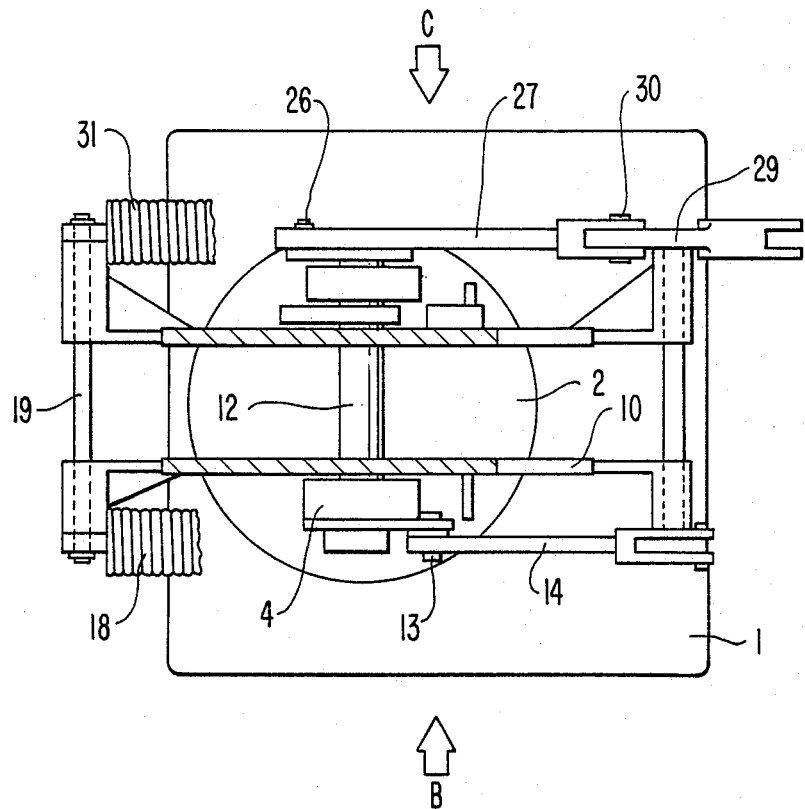
Figure 2:
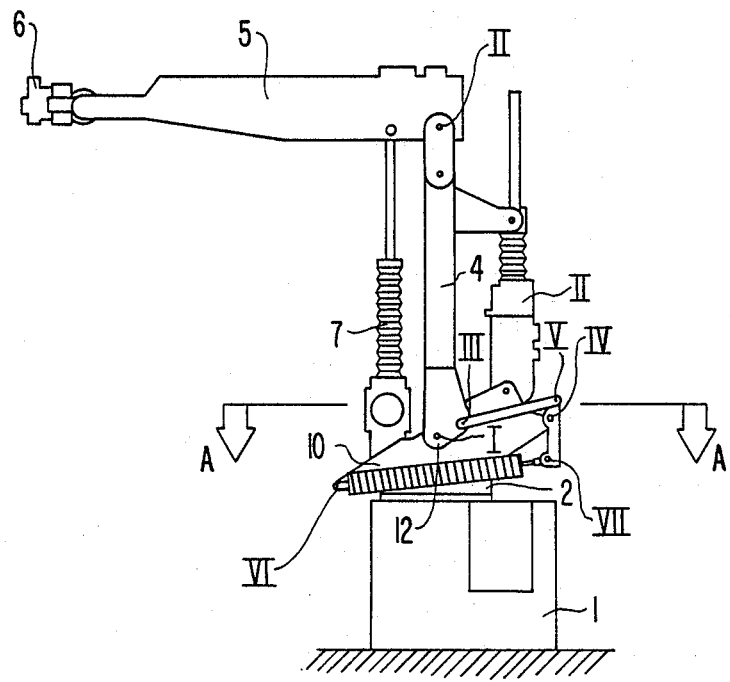
FIG. 2 is a front view of a robot incorporating the balancing mechanism according to the present invention.
Figure 3:
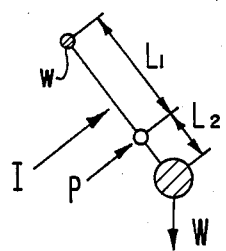
FIG. 3 shows the principle of the balancing mechanism.

FIGS. 1(a), 1(b) and 1(c) each show an essential part of an embodiment of the balancing mechanism according to the present invention, where FIGS. 1(a) and 1(b) are views as seen when looking in the directions of the arrows B and C, respectively, in FIG. 1(c), which is a sectional view taken through the essential parts thereof. FIG. 2 shows the front view of a robot incorporating the balancing mechanism according to the present invention, and FIG. 1(c) is a section taken along the line A—A thereof, viewed in the direction of the arrows.

Figure 4:
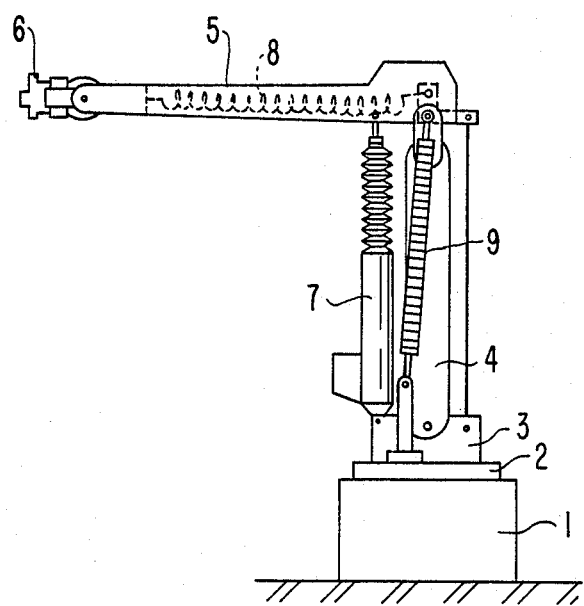
FIG. 4 is a front view of a robot incorporating a conventional balancing mechanism.

A robot which incorporates the balancing mechanism according to the present invention is constructed in the same manner as that shown in FIG. 4. In other words, reference numeral 1 denotes a base of the robot; reference numeral 2 denotes a swivel slide mounted rotatably on the base 1; reference numeral 10 denotes a swivel support body mounted on the swivel slide; reference numeral 4 denotes a first arm extending vertically and pivotally mounted on the swivel support body 10; reference numeral 5 denotes a second arm extending horizontally and pivotally mounted on the upper portion of the vertical arm 4; reference numeral 6 denotes a wrist provided at the far end of the horizontal arm 5;

reference numeral 7 denotes an actuator for driving the horizontal arm 5; and reference numeral 11 denotes an actuator for driving the vertical arm 4.

FIG. 1(a) shows the balancing mechanism for balancing the vertical arm 4. The vertical arm 4 is pivotally supported on the swivel support body 10 by a horizontal shaft 12 defining a horizontal pivot axis I. A generally horizontally extending first link 14 is pivotally connected to the lower portion of the vertical arm 4 by a horizontal pin 13 defining a horizontal pivot axis III. A generally vertically extending first lever 16 is pivotally mounted on the swivel support body 10 by a horizontal pin 15 defining a horizontal pivot axis IV. The link 14 is connected to the upper end of the lever 16 by a horizontal pin 17 defining a horizontal pivot axis V in such a manner that the link 14 and the lever 16 can rotate relative to each other. One end of a generally horizontally extending first spring 18 is pivotally supported below arm 4 by a horizontal pin 19 defining a horizontal pivot axis VI on the end of the swivel support body 10 opposite to that on which the lever 16 is supported. The other end of the spring 18 is connected to the lower end of the lever 16 by a horizontal pin 20 defining a horizontal pivot axis VII.

A pivotal force applied to the vertical arm 4 is first transferred to the link 14 which is pivotally supported about the pin 13 separated from the shaft 12 by a distance r, and is then transferred to the spring 18 through the pin 17, the lever 16 and the pin 20.

When the force is applied to the vertical arm 4, increasing the angle of the inclination $\theta$ of the vertical arm 4 (when the vertical arm 4 is perpendicular, $\theta=0$), the link 14 is pulled via the pin 13 by means of the moment given by the arm length r, causing the lever 16 to pivot about the pin 15 via the pin 17. The quantity of movement is amplified in accordance with a lever ratio of $R_3/R_4$ ($R_3$: the distance between the axis of the pin 15 and the axis of the pin 17; $R_4$: the distance between the axis of the pin 15 and the axis of the pin 20) of the lever 16, and the spring 18 is expanded. At the same time, the moment about the pin 15 changes as the angle between the pins 15, 17 and the link 14 and the angle between the pins 15, 20 and the spring 18 change, thereby ensuring that the vertical arm 4 is balanced at any position along its path.

FIG. 1(b) shows the balancing mechanism used for balancing the horizontal arm 5. The horizontal arm 5 is rotatably coupled to the upper portion of the vertical arm 4 by a horizontal shaft 21 defining a horizontal pivot axis II. A substantially L-shaped second lever 22 is rotatably mounted on the shaft 12. A generally vertically extending second link 25 is pivotally connected between one end of the lever 22 and the horizontal arm 5 by the respective horizontal pins 23 and 24, respectively defining horizontal pivot axes VIII and IX. A generally horizontally extending third link 27 is coupled to the other end of the lever 22 by a horizontal pin 26 defining a horizontal pivot axis X. A generally vertically extending third lever 29 is pivotally supported on the swivel support body 10 by a horizontal support pin 28 defining a horizontal pivot axis XI which is mounted on the same shaft as the pin 15 which supports the lever 16. The link 27 is pivotally coupled to the upper end of the lever 29 by a horizontal pin 30 defining a horizontal pivot axis XIV. One end of a generally horizontally extending second spring 31 is pivotally supported for rotation about a pivot axis XII on the pin which also supports one end of the spring 18. The other end of the spring 31 is connected to the lower end of the lever 29 by a horizontal pin 32 defining a horizontal pivot axis XIII.

A pivotal force applied to the horizontal arm 5 is transferred to the lever 22 through the link 25, pivoting the lever 22 by the moment defined by an arm length $R_1$ (the distance between the axis of the shaft 12 and the axis of the pin 24). The quantity of movement is changed in accordance with a lever ratio of $R_1/R_2$ ($R_2$ is the distance between the axis of the shaft 12 and the axis of the pin 26) of the lever 22, and the force is transferred to the link 27, and is then transmitted to the spring 31 through the lever 29 and the pin 32. Thus, in the same way as the vertical arm 4, the horizontal arm 5 is balanced at any position along its path by means of the link mechanism.

If the balancing mechanism according to the present invention is applied to a robot which is operated in playback mode in the above-described manner, it is possible for its arm to be uniformly balanced at any position in its operating range, increasing the teaching capability thereof.

In the above-described embodiment, the balancing mechanism according to the present invention is applied to the arm of a robot. However, the invention is not limited to a robot arm; it may be applied to any mechanism which requires balancing.

According to the balancing mechanism of the present invention, it is possible to substantially and uniformly balance a balanced object such as a robot arm at any position along its range of motion. In addition, since the weight constituted by a spring is placed at a lower portion of the balanced object, the moment of inertia can be reduced, and the balancing capability is increased with a simple structure and at a reduced cost. In addition, owing to the use of springs, the balancing force can be maintained even during a power failure. The employment of this link mechanism also enables an improvement in response.

What is claimed is:

1. In an industrial robot having a support body, a vertically extending first arm having a first end and a second end opposite said first end, pivotally mounted at said first end to said support body for rotation about a first horizontal axis, a second arm having a third end and a fourth end opposite said third end, pivotally mounted to said second end of said first arm at said third end for rotation about a second horizontal axis, and a balancing means, including spring members which expand when said first and second arms pivot, for respectively balancing said first and second arms when said first and second arms pivot, the improvement wherein said balancing means includes a first link pivotally connected at one end thereof to said first arm for rotation about a third horizontal axis spaced from said first horizontal axis, a first lever pivotally connected to said support body for rotation about a fourth horizontal axis and pivotally connected to said first link for rotation about a fifth horizontal axis at another end of said first link opposite said one end on one side of said fourth horizontal axis, and a first expandable spring member pivotally mounted at one end to said support body for rotation about a sixth horizontal axis and pivotally connected at an opposite end to said first lever for rotation about a seventh horizontal axis on another side of said fourth horizontal axis angularly spaced about said fourth horizontal axis from said one side, each of said first, second, third, fourth, fifth, sixth and seventh horizontal axes extending parallelly to one another, whereby rotation of said first arm about said first horizontal axis pivots said first lever about said fourth horizontal axis through said first link, thereby to expand said first spring member and pivot said first spring member about said sixth horizontal axis.

2. The improvement as in claim 1, wherein said fourth horizontal axis is horizontally spaced from said third horizontal axis, said first link and said first spring member extend generally horizontally and said first lever extends generally vertically between said other end of said first link and said opposite end of said first spring member.

3. The improvement as in claim 1, wherein said balancing means further comprises a second lever pivotally mounted on said support body for rotation about said first horizontal axis, a second link having one end pivotally connected to said second arm for rotation about an eighth horizontal axis and another end pivotally connected to an end of said second lever for rotation about a ninth horizontal axis at a side of said first horizontal axis, a third link having one end pivotally connected to said second lever for rotation about a tenth horizontal axis at another side of said first horizontal axis angularly spaced about said first horizontal axis from said one side of said first horizontal axis, a third lever pivotally mounted to said support body for rotation about an eleventh horizontal axis and being pivotally connected on one side of said eleventh horizontal axis to another end of said third link opposite said one end of said third link, and a second expandable spring member pivotally mounted at one end to said support body for rotation about a twelfth horizontal axis and pivotally connected at an opposite end to said third lever for rotation about a thirteenth horizontal axis on another side of said eleventh horizontal axis spaced from said one side of said eleventh horizontal axis, said eighth, ninth, tenth, eleventh, twelfth and thirteenth horizontal axes extending parallelly to said first horizontal axis, whereby rotation of said second arm about said second horizontal axis pivots said third lever about said eleventh horizontal axis through said second link, said second lever and said third link, thereby to expand said second spring member and pivot said second spring member about said thirteenth horizontal axis.

4. The improvement as in claim 3, wherein said eleventh axis is aligned with said fourth horizontal axis and said twelfth horizontal axis is aligned with said sixth horizontal axis.

5. The improvement as in claim 4, wherein said fourth horizontal axis is horizontally spaced from said tenth horizontal axis, said third link and said second spring member extend generally horizontally, said second link extends generally vertically between said eighth and ninth horizontal axes and said third lever extends generally vertically between said other end of said third link and said opposite end of said second spring member.

6. In an industrial robot having a support body, a vertically extending first arm having a first end and a second end opposite said first end, pivotally mounted at said first end to said support body for rotation about a first horizontal axis, a second arm having a third end and a fourth end opposite said third end, pivotally mounted to said second end of said first arm at said third end for rotation about a second horizontal axis, and a balancing means, including spring member which expand when said first and second arms pivot, for respectively balancing said first and second arms when said first and second arms pivot, the improvement wherein said balancing means further comprises a second lever pivotally mounted on said support body for rotation about said first horizontal axis, a second link having one end pivotally connected to said second arm for rotation about an eighth horizontal axis and another end pivotally connected to an end of said second lever for rotation about a ninth horizontal axis at a side of said first horizontal axis, a third link having one end pivotally connected to said second lever for rotation about a tenth horizontal axis at another side of said first horizontal axis angularly spaced about said first horizontal axis from said one side of said first horizontal axis, a third lever pivotally mounted to said support body for rotation about an eleventh horizontal axis and being pivotally connected on one side of said eleventh horizontal axis to another end of said third link opposite said one end of said third link for rotation about a fourteenth horizontal axis, and an expandable spring member pivotally mounted at one end to said support body for rotation about a twelfth horizontal axis and pivotally connected at an opposite end to said third lever for rotation about a thirteenth horizontal axis on another side of said eleventh horizontal axis spaced from said one side of said eleventh horizontal axis, each of said first, second, eighth, ninth, tenth, eleventh, twelfth and thirteenth horizontal axes being parallel to one another, whereby rotation of said second arm about said second horizontal axis pivots said third lever about said eleventh horizontal axis through said second link, said second lever and said third link, thereby to expand said spring member and pivot said spring member about said twelfth horizontal axis.

7. In a mechanism having a base and a swivel support body on said base, a vertically extending first arm having a first end and a second end opposite said first end, pivotally mounted at said first end to said body for rotation about a first horizontal axis, a second arm having a third end and a fourth end opposite said third end, pivotally mounted to said second end of said first arm at said third end for rotation about a second horizontal axis, first and second actuator means for respectively driving said first and second arms about said first and second horizontal axes, and a balancing means, including spring members which expand when said first and second arms pivot, for respectively balancing said first and second arms when said first and second arms are driven about said first and second horizontal axes by said actuator means, the improvement wherein said balancing means includes a first expandable spring member pivotally mounted at one end to said body and means, including a first lever pivotally mounted to said body and a first link, pivotally series connected between said first end of said first arm and an opposite end of said first spring member, for expanding said first spring member in response to rotation of said first arm, and a second expandable spring member pivotally mounted at one end to said body and means for expanding said second spring member in response to rotation of said second arm, which expanding means includes a third lever pivotally mounted to said body and a third link, pivotally series connected between said second arm and an opposite end of said second spring member.

8. The improvement as in claim 7, wherein said first link is pivotally connected at one end thereof to said first end of said first arm for rotation about a third horizontal axis spaced from said first horizontal axis and said first lever is pivotally connected to said body for rotation about a fourth horizontal axis and pivotally connected to said first link for rotation about a fifth horizontal axis at another end of said first link opposite said one end on one side of said fourth horizontal axis, another side of said first lever angularly spaced from the one side thereof being pivotally coupled to said opposite end of said first spring member.

9. The improvement as in claim 8, wherein said first and second spring members are located below said first horizontal axis and respectively extend in generally horizontal directions.

* * * * *